United States Patent Office 3,076,139
Patented Jan. 29, 1963

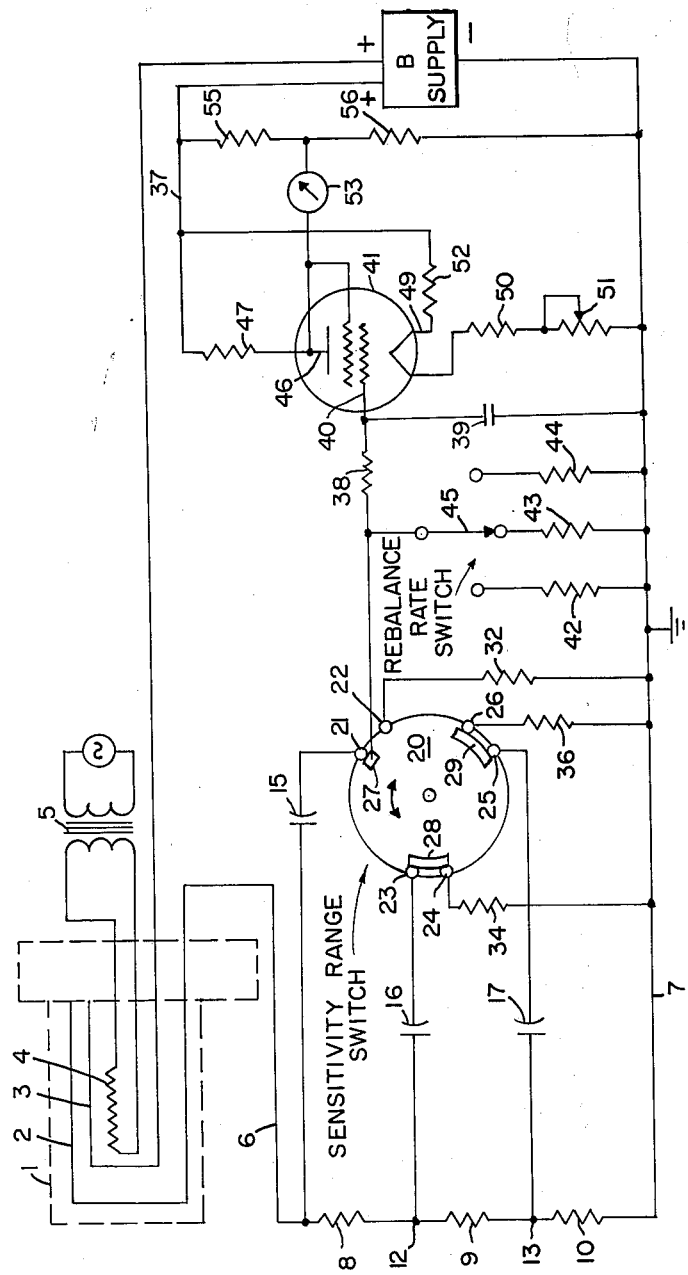

3,076,139
LEAK DETECTOR
John A. Roberts, Lynnfield Center, Mass., assignor to General Electric Company, a corporation of New York
Filed Jan. 3, 1961, Ser. No. 80,429
5 Claims. (Cl. 324—33)

The present invention relates to a leak detector indicating system, and more particularly, to an improved coupling circuit for use in wide range or multi-range leak detector systems.

It is known to detect substances such as certain gases or vapors in an atmosphere by passing a sample of an atmosphere suspected of containing a concentration of the substance to be detected through an electrical discharge device under conditions which permit the substance to induce positive ion formation at a positively charged electrode or anode with the positive ions so formed collected by a negatively charged electrode to produce an indicating current which varies with the concentration of the substance. A method and apparatus for such detection is described and claimed in Patent No. 2,550,498, issued on April 24, 1951, and assigned by the inventor, Chester W. Rice, to the same assignee as the present invention. For certain testing procedures, it is desirable to have the indicator associated with the detector responsive only to sudden changes in the variable. Such an arrangement is desirable, for example, where the presence of the variable is being utilized as a means of detecting leakage of the variable from a closed system and the detector is moved about or located in an atmosphere containing changing amounts of the variable. Under such conditions where the background amount of the variable is not constant, it is desirable to have an instrument which will respond only to sudden changes of the variable as are encountered in the presence of leaks. Under other circumstances, it is desirable to have an instrument which will detect gradual changes in the concentration of the variable being detected and indicate a predetermined level of concentration.

Various arrangements have been proposed and used to enable a leak detector, operating on such principles to distinguish between gradual and sudden changes of the variable to which the system is responsive. One such arrangement for detecting sudden changes of the variable to which the system is responsive utilizes an RC coupling circuit between the electrical discharge device load circuit and the amplifier which drives the leak indicating means. It is also common practice to provide a voltage divider type of load impedance for the electrical discharge device. Selection of portions of the leak signal developed across the voltage divider may then be utilized to change the sensitivity range of the leak detector system. However, problems are encountered in changing the sensitivity ranges of the leak detector system in which an RC coupling network is utilized between the discharge device load circuit and the amplifier stages because of the currents which flow through the load impedance due to the variable background tracer and normal leakage through the electrical discharge device. Such background current flow provides a signal across the load impedance which is present even in the absence of the substance being detected due to a leak. Varying the sensitivity range of the instrument by selectively connecting the input of the RC coupling circuit to various portions of the load impedance varies the voltage level due to background and leakage which is applied to the capacitor in the RC coupling circuit upon switching range. This may cause sudden and sometimes radical transient current flows as the capacitor in the coupling circuit is first charged to the new background level and then discharged by the bleeder resistor. Not only is the automatic balance ineffective for a short period of time but "pegging" of the output instruments often occurs along with a false leak indication following the switching of the sensitivity range.

Also, prior art arrangements which utilize automatic rebalancing RC networks with selective manual rebalance and quantitative indications include problems of rezeroing when switching ranges during manual balance operation and problems of zero drift during manual balance operation.

It is an object of this invention to provide an improved leak detector coupling system which obviates the above problems.

It is a further object of this invention to provide an improved leak detector coupling circuit which minimizes or eliminates transient unbalance conditions while switching sensitivity ranges.

It is a still further object of this invention to provide an improved leak detector coupling circuit for controlling the overall sensitivity of the indicator.

It is yet another object of this invention to provide an improved leak detector coupling circuit combining the benefits obtained through use of automatic and manual balance arrangements.

Further objects and advantages of the invention will become apparent as the following description proceeds, and the features of novelty which characterize the invention will be pointed out with particularity in the claims annexed to and forming a part of this specification.

In accordance with one form of the invention, an improved leak detector RC coupling circuit is provided for coupling the detector signals developed in response to a variable tracer gas across a voltage divider to the leak indicator. A multi-position switch having pairs of contacts is provided with one contact of each pair being connected through an individual capacitor to preselected points on the voltage divider. The other contact of each pair is connected through an individual resistor to a different point on the voltage divider forming RC shunts about portions of the voltage divider through the associated switch contact pairs. The switch segments enable selective connection of one switch contact to which a capacitor is connected to the output of the coupling circuit while connecting each of the remaining pairs of contacts together. An output resistor shunts the output of the circuit and in combination with the selectively connected capacitor forms an RC coupling circuit. The remaining capacitors are charged to the potential of the divider across which they and their associated resistors are connected.

For a better understanding of this invention, reference may be had to the accompanying drawing which shows a simplified schematic representation of a leak detector embodying the invention and illustrating portions thereof in block diagram form.

Referring to the single FIGURE, air containing the variable, such as a halogen gas, which is to be detected is applied to the detector 1 comprising a diode arrangement across which a potential is applied such that the collector electrode 2 is negative relative to the anode 3. The air containing the gas to be detected is passed between the anode 3 and collector 2. Filament 4 is energized by suitable means such as transformer 5. The amount of current which flows in the collector circuit is a function of the amount of the halogen gas between the electrodes 2 and 3 of the detector.

The device described thus far is essentially the same as that set forth in the aforesaid Rice patent.

The collector currents are connected via lead 6 to the B minus potential at lead 7 through a voltage divider comprising series resistors 8, 9, and 10. The voltage developed across the divider network 8, 9, and 10 varies as the degree of ionization of the detector 1 due to the presence of the tracer gas when a leak is encountered.

However, a voltage is developed across the divider network as a result of current flow therein due to background tracer present in the testing area and also due to leakage currents flowing through the detector 1. Such signals may be of a steady state nature or may vary with the concentration of the background tracer gas. At any rate, the voltage developed across the divider network 8, 9, and 10 due to such background develops a voltage across conductors 6 and 7. If the resistors 10, 9, and 8 are such that the resistance from a common point is in the ratio of 1, 10, and 100, as is common, for example, 1 megohm, 100,000 ohms, and 10,000 ohms, respectively, the voltage developed at junction 12 between resistors 8 and 9 relative to grounded conductor 7 will be approximately 1/10 that of conductor 6 relative to ground while the voltage developed at junction 13 between resistors 9 and 10 will be approximately 1/100 that developed at conductor 6.

If the sensitivity range selector circuit includes RC coupling, and the selector is connected selectively to conductor 6 or junction 12 or junction 13, the change in voltage applied to the capacitor in the coupling circuit due to the background voltages at conductor 6, junction 12, and junction 13 would provide transient charging currents through the capacitor. The transient currents would provide erroneous leak indications and transient conditions such as the pegging of the output indicator. In the present invention means are provided to maintain capacitors 15, 16, and 17 which may all be .01 microfarad and are respectively connected to conductor 6, junction 12, and junction 13 at the potential of the portion of the voltage divider to which they are selectively connected into the circuit during operation of the range selector switch 20. Range selector switch 20 is of the rotary wafer switch variety and contains a pair of contacts 21, 22; 23, 24; and 25, 26 associated with each tap on the voltage divider. The ends of capacitors 15, 16 and 17, which are remote from the voltage divider network, are connected to contacts 21, 23 and 25, respectively. The remaining contacts of each pair 22, 24, and 26 are connected to grounded lead 7 through resistors 32, 34 and 36, respectively. Switch 21 includes rotary conductive wiper segments 27, 28 and 29, with segments 28 and 29 being sufficiently large to short across the pair of contacts at which they are located, while segment 27 is sufficiently small so as to be sequentially actuated to contacts 21, 23 or 25 without shunting these contacts to their associated contacts 22, 24, and 26.

In the position shown in the drawings, segment 28 connects contacts 23 and 24 together thus connecting capacitor 16 to resistor 34, while segment 29 connects contacts 25 and 26 together thus connecting capacitor 17 to resistor 36. Under such conditions capacitor 16 may charge to the voltage present at junction 12 and capacitor 17 may likewise charge to the voltage present at junction 13 of the voltage divider. Wiper segment 27 is connected to the grid 40 of the electrometer tube 41 through the 470,000 ohm grid resistor 38. The electrometer tube 41 may, for example, be of the type 5886 variety exhibiting a desirably high grid resistance.

Grid 40 of electrometer tube 41 may be selectively connected to ground through grid resistor 38 and resistors 42, 43, and 44 through the action of the rebalance rate selector switch 45. The plate 46 of tube 41 is connected through the plate load resistor 47 to B+ lead 37 which will normally be of a smaller magnitude than the B+ supplied to the detector 1. The filament 49 of tube 41 which is energized by direct current flow therethrough from a voltage divider which connects one side to ground through fixed resistor 50 and variable resistor 51 which in combination with resistor 52 connected between the filament and B+ lead 37 determines the D.C. bias applied to the filament. An electrical indicator 53, which may comprise a conventional D.C. electric instrument and/or an indicator alarm arrangement is connected between the plate 46 and the junction of the voltage divider formed by resistors 55 and 56 connected between the B+ lead 37 and ground.

Thus, in the arrangement shown in FIG. 1 the grid 40 of tube 41 is connected through grid resistor 38, wiper 27, contact 21, and capacitor 15 to conductor 6 at the top of the voltage divider network 8, 9, and 10 applying the full voltage developed across the voltage divider to the tube and providing maximum sensitivity. Capacitor 15 will couple any change of voltage occurring because of a leak to the tube 41 for leak indication. The rate at which the coupling circuit will automatically rebalance is determined by the RC time constant of the capacitor 15 in combination with the selected resistor 42, 43, or 44. Resistors 42, 43 and 44 may be, for example, 10,000 megohms, 100 meghoms, and 1 meghom, respectively, to provide slow, medium, and fast rebalancing rates, respectively. With a fast rebalance rate the leak detector system is responsive only to changes in the tracer gas to which it is responsive such that when probing an area suspected of leakage there will be a leak indication as the leak is approached by the leak detector probe and the level of tracer gas increases. However, with a fast rebalancing rate the system will rebalance such that when the probe is held directly over the leak there will be no leak indication since there is no change of the amount of tracer gas which quantitatively may be large. Under circumstances where it is desired to pinpoint the leak without making a series of passes back and forth over the leak area a low leakage rebalance rate may be desirable such that the leak detector during the long rebalance period will act in a quantitative manner and provide an indication related to the magnitude of the tracer gas. Thus, the rebalance rate selector switch selectively enables conditions providing benefits of either or both automatic and manual rebalance type of controls.

Higher frequency noise and unwanted signals may be decoupled and kept from the grid 40 of tube 41 by the bypass capacitor 39 which may, for example, be 100 micro-microfarads. Thus, resistor 38 and capacitor 39 will, in combination with the RC coupling circuit connected intermediate them and the voltage divider 8, 9, and 10, provide a band pass coupling arrangement.

While the sensitivity range switch 20 is in the position shown in the figure capacitors 16 and 17 are charged to the voltage present at junctions 12 and 13, respectively, such that upon a change of the sensitivity range, for example, upon the counterclockwise rotation of switch 20 such that segment 27 is brought into engagement with contact 23, capacitor 16 will be connected directly to the grid circuit of the tube 41 and disconnected from the charging resistor 34 such that there will be negligible transients due to switching to the voltage appearing at junction 12. Simultaneously, segment 29 will be rotated to shunt contacts 21 and 22 enabling capacitor 15 to become and remain charged through resistor 32 at the voltage level appearing across conductor 6 and segment 28 will have rotated to shunt contacts 25 and 26 to charge and maintain capacitor 17 through resistor 36 at the voltage level appearing at junction 13 in readiness for any subsequent actuation of the sensitivity range switch 20.

Having thus described the invention, it is to be understood that the foregoing disclosure relates only to a preferred embodiment of the invention and that numerous modifications of alterations may be made therein without departing from the spirit or scope of the invention as set forth in the appended claims.

What I claim as new and desire to secure by Letters Patent of the United States is:

1. In a leak detector system of the type wherein a gas responsive detector provides a signal current in response to a variable tracer gas, a voltage divider in circuit with said gas responsive detector for developing voltages in response to said signal current, an RC coupling circuit comprising a multi-position switch having pairs of contacts, one contact of each pair being connected through a capacitor to preselected points on said voltage divider, the other contact of each pair being connected through a resistor to a different point on said voltage divider thereby forming RC shunts about preselected portions of said voltage divider through said switch contact pairs, means to selectively connect at least one contact connected to a capacitor to an indicator circuit, said switch including means to connect each of the remaining pairs of contacts together and an output resistor which in combination with said selectively connected capacitor shunts a portion of said voltage divider.

2. In a multi-range leak detector system of the type wherein a gas responsive detector provides detector current in response to a variable tracer gas, a voltage divider in circuit with said gas responsive detector for developing voltages in response to said detector current, an indicator circuit, an RC coupling circuit interposed between said detector and said indicator circuit comprising a multi-position switch having pairs of contacts, one contact of each pair being connected through a capacitor to preselected points on said voltage divider, the other contact of each pair being connected through a resistor to a different point on said voltage divider thereby forming RC shunts about preselected portions of said voltage divider through said switch contact pairs, means to selectively connect at least one contact connected to a capacitor in series with the output of the coupling circuit, the output of said coupling circuit being connected to said indicator circuit, said switch including means to connect each of the remaining pairs of contacts together, and an output resistor which shunts said output and in combination with said selectively connected capacitor forms an RC coupling circuit.

3. In a multi-range leak detector system of the type wherein a gas responsive detector provides detector current in response to a variable tracer gas, a voltage divider in circuit with said gas responsive detector for developing voltages in response to said detceor, an indicator circuit, an RC coupling circuit interposed between said detector and said indicator circuit comprising a multi-position switch having pairs of contacts, one contact of each pair being connected through an individual capacitor to preselected points on said voltage divider, the other contact of each pair being connected through an associated resistor to a different point on said voltage divider thereby forming RC shunts about preselected portions of said voltage divider through said switch contact pairs, means to selectively connect at least one contact connected to a capacitor in series with the output of the coupling circuit, the output of said coupling circuit being connected to said indicator circuit, said switch including means to connect each of the remaining pairs of contacts together, and an output resistor which shunts said output and in combination with said selectively connected capacitor forms an RC coupling circuit, the said output resistor being variable.

4. In a multi-range leak detector system of the type wherein a gas responsive detector provides detector current in response to a variable tracer gas, a voltage divider in circuit with said gas responsive detector for developing voltages in response to said detector current, an indicator circuit, an RC coupling circuit interposed between said detector and said indicator circuit comprising a multi-position sensitivity range switch having pairs of contacts, one contact of each pair being connected through an individual capacitor to preselected points on said voltage divider, the other contact of each pair being connected through an associated resistor to a different point on said voltage divider thereby forming RC shunts about preselected portions of said voltage divider through said switch contact pairs, means to selectively connect at least one contact connected to a capacitor in series with the output of the coupling circuit. the output of said coupling circuit being connected to said indicator circuit, said switch including means to connect each of the remaining pairs of contacts together, and an output resistor which shunts said output and in combination with said selectively connected capacitor forms an RC coupling circuit, the said output resistor being variable to vary the rebalance rate of said leak detector.

5. In a multi-range leak detector system of the type wherein a gas responsive detector provides detector current in response to a variable tracer gas, a voltage divider in circuit with said gas responsive detector for developing voltages in response to said detector current, an indicator circuit, an RC coupling circuit interposed between said detector and said indicator circuit comprising a multi-position, wafer-type of sensitivity range switch having pairs of contacts, one contact of each pair being connected through an individual capacitor to preselected points on said voltage divider, the other contact of each pair being connected through an associated resistor to a different point on said voltage divider thereby forming RC shunts about preselected portions of said voltage divider through said switch contact pairs, means to selectively connect at least one contact connected to a capacitor in series with the output of the coupling circuit, the output of said coupling circuit being connected to said indicator circuit, said switch including means to connect each of the remaining pairs of contacts together, and an output resistor which shunts said output and in combination with said selectively connected capacitor forms an RC coupling circuit, the said output resistor being variable to vary the rebalance rate of said leak detector and connected across the input circuit of an electrometer tube associated with said indicator.

References Cited in the file of this patent

UNITED STATES PATENTS

| | | |
|---|---|---|
| 2,934,694 | Vacca | Apr. 26, 1960 |
| 2,970,259 | Marsden | Jan. 31, 1961 |